United States Patent [19]

Foglesonger et al.

[11] Patent Number: 4,638,273
[45] Date of Patent: Jan. 20, 1987

[54] WAVEGUIDE ASSEMBLY
[75] Inventors: John D. Foglesonger, Los Angeles; David M. Vranson, Canyon Country, both of Calif.
[73] Assignee: ITT Corporation, New York, N.Y.
[21] Appl. No.: 631,425
[22] Filed: Jul. 16, 1984
[51] Int. Cl.$^4$ .............................................. H01P 1/04
[52] U.S. Cl. .................................... 333/254; 285/405; 285/915; 403/336; 403/344
[58] Field of Search ................. 333/254, 255; 29/600; 285/405, 414, DIG. 16; 403/265, 335, 336, 344

[56] References Cited

U.S. PATENT DOCUMENTS 3,343,252  9/1967  Reesor ........................ 285/DIG. 16
3,500,264  3/1970  Floyd, Jr. ............................ 333/254
3,942,141  3/1976  Kaffenberger ...................... 333/254
4,150,848  4/1979  Dyrup ............................ 285/414 X

FOREIGN PATENT DOCUMENTS 2947245  6/1981  Fed. Rep. of Germany ........ 29/600

Primary Examiner—Paul Gensler
Attorney, Agent, or Firm—T. L. Peterson; J. S. Christopher

[57] ABSTRACT

A waveguide joint with flanges bonded to a waveguide section. Each flange is divided into two pieces with internal knurling and corner projections to bite into the external waveguide corners. The flange pieces are pressed on while the bonding adhesive is cured.

4 Claims, 9 Drawing Figures

WAVEGUIDE ASSEMBLY

BACKGROUND OF THE INVENTION

This invention relates to waveguide constructions, and more particularly to a waveguide joint and to a method of making the same.

PRIOR ART STATEMENT

In the past, it has been the practice to bond flanges to sections of waveguide by dip brazing. This has caused waveguide corrosion and loss of dimensions.

SUMMARY OF THE INVENTION

In accordance with the present invention, there is provided a waveguide joint having flanges bonded thereto with a cold or moderately warmly cured adhesive. Structural strength is provided in other ways. The corrosion and loss of dimensions in the prior art dip brazing are thus avoided.

BRIEF DESCRIPTION OF THE DRAWINGS

In the accompanying drawings which illustrate exemplary embodiments of the present invention.

DESCRIPTION OF THE PREFERRED EMBODIMENTS

Figure 1:
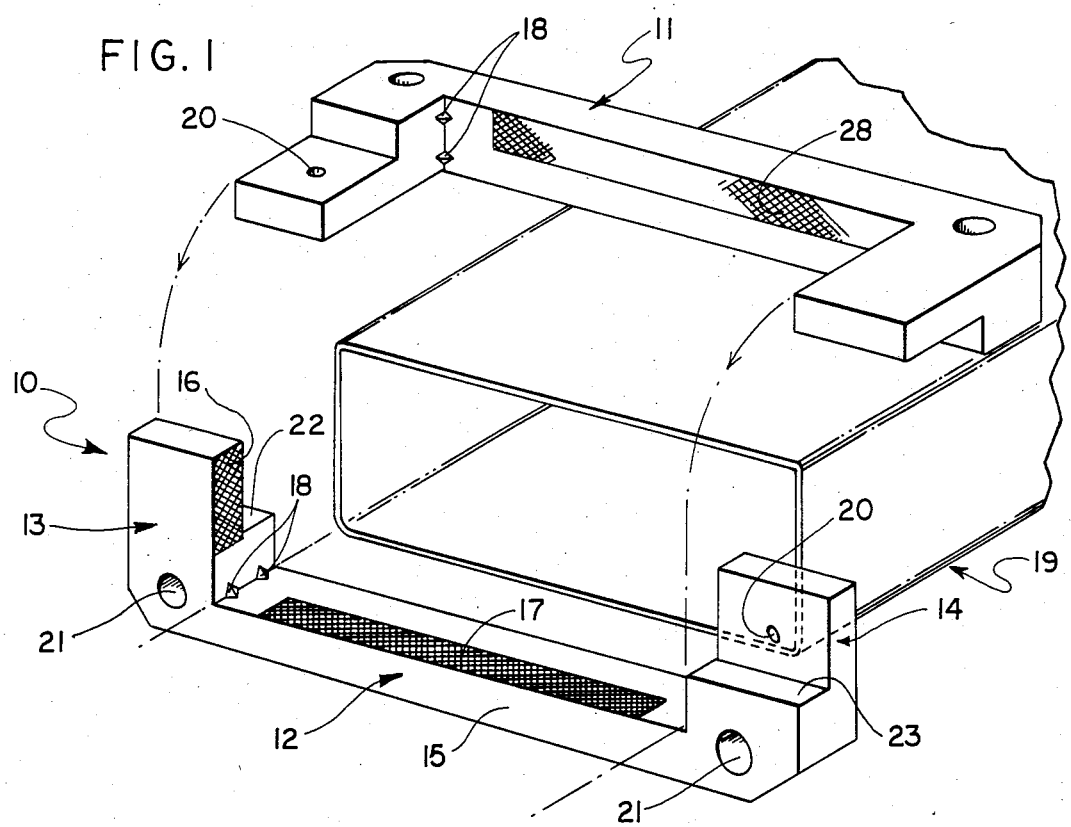
FIG. 1 is a perspective view of some component parts of the waveguide joint of the present invention.
Figure 7:
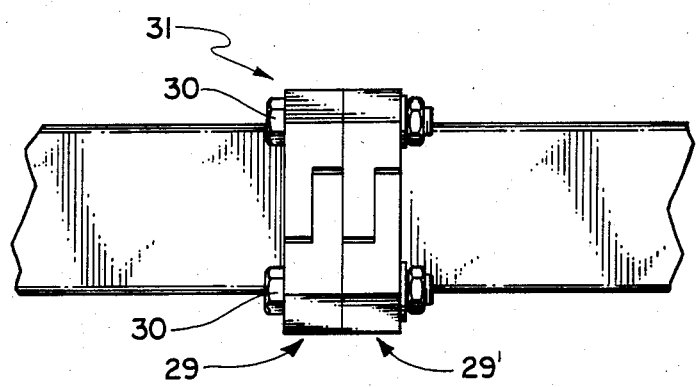
FIG. 7 is a side elevational view of a waveguide joint constructed in accordance with the present invention.

In the drawings, in FIG. 1 enough parts are shown to make one subassembly, two of which are required to make a complete waveguide joint (FIG. 7).

In FIG. 1, a flange 10 is provided in two pieces 11 and 12. If desired, pieces 11 and 12 may be identical. Thus, only piece 12 will be described in detail.

Piece 12 is U-shaped having legs 13 and 14, and a bight portion 15.

Leg 13 is knurled at 16. Leg 14 is not knurled at all. Bight portion 15 is knurled at 17.

Each piece 11 and 12 has four projections 18 in the internal corners thereof.

The knurled surfaces 16 and 17 on both pieces 11 and 12 are pressed with an adhesive against the exterior of a waveguide section 19 for strength and to provide a gas tight seal.

Figure 8:
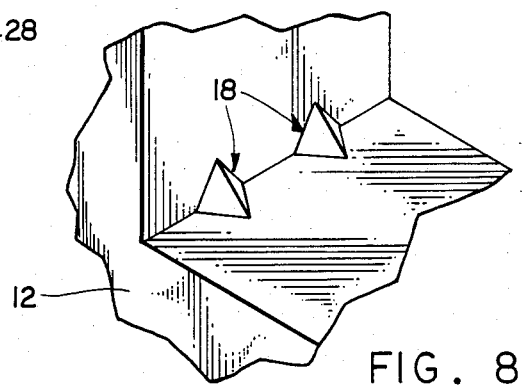
FIG. 8 is an enlarged perspective view of a partly broken away flange.

Projections 18 (see also FIG. 8) bite into the exterior corners of waveguide section 19 to prevent energy leakage and/or to prevent gas leakage.

Figure 3:
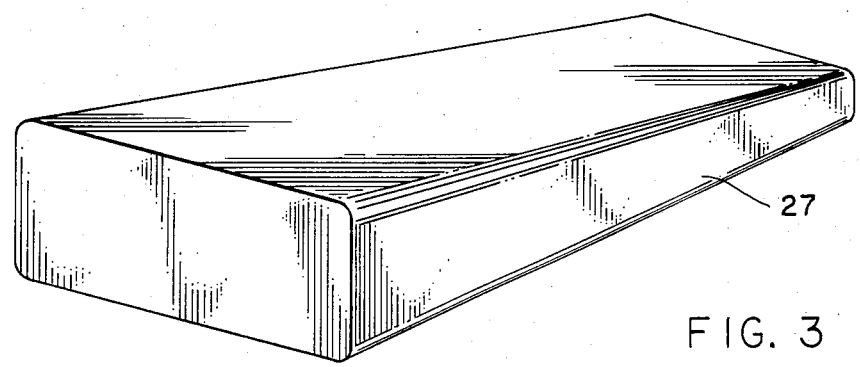
FIG. 3 is a perspective view of a mandrel.

Guide holes are provided at 20 in FIG. 1 for insertion of pins after pressure is applied by a mandrel 27 (FIG. 3) to fix the parts together.

Bolt holes are provided at 21 in FIG. 1.

Legs 13 and 14 have stepped portions 22 and 23, respectively.

Figure 2:
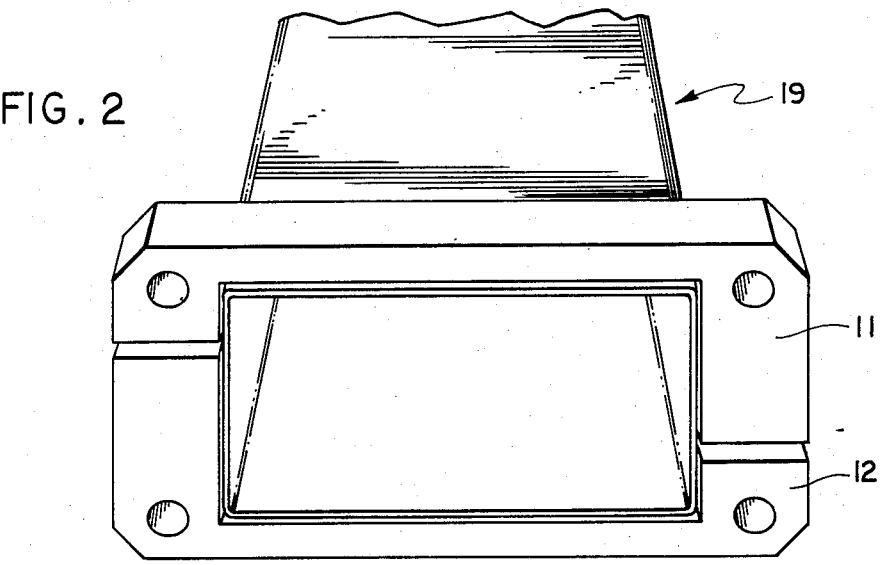
FIG. 2 is a perspective view of the parts of FIG. 1 partly assembled.
Figure 4:
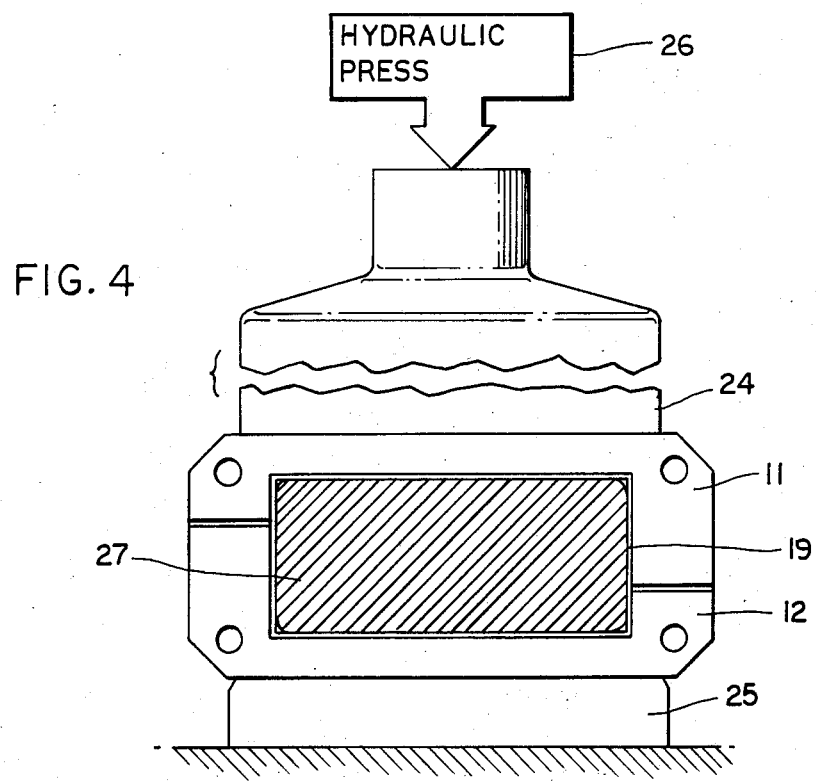
FIG. 4 is a side elevational view of a hydraulic press with a mandrel in cross section for forming the waveguide joint.

Before pressure is applied, pieces 11 and 12 may generally be fitted in the positions shown in FIG. 2. Then, they are pressed together as illustrated in FIG. 4 in the jaws 24 and 25 of a hydraulic press 26, with a mandrel 27 located inside waveguide section 19. See also that mandrel 27 in FIG. 3 may be tapered in one or two dimensions.

Figure 6:
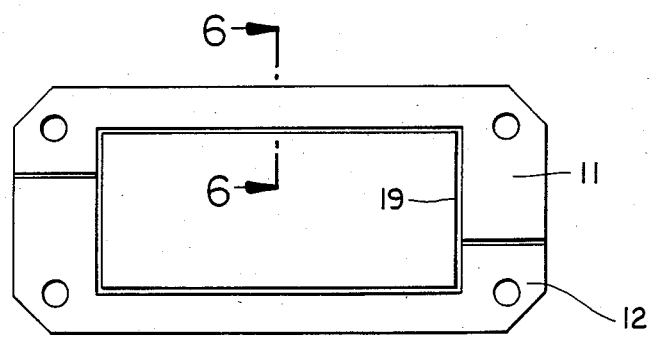
FIG. 6 is a broken away longitudinal sectional view taken on the line 6—6 shown in FIG. 5.

Adhesive 28 is shown in FIG. 6.

Figure 5:
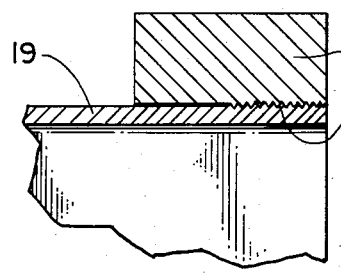
FIG. 5 is a side elevational view of a subassembly constructed in accordance with the present invention.

The parts shown in FIG. 5 may be called a subassembly 29. Subassembly 29 is shown bolted at 30 to an identical subassembly 29' in FIG. 7 to provide a waveguide joint 31.

Figure 9:
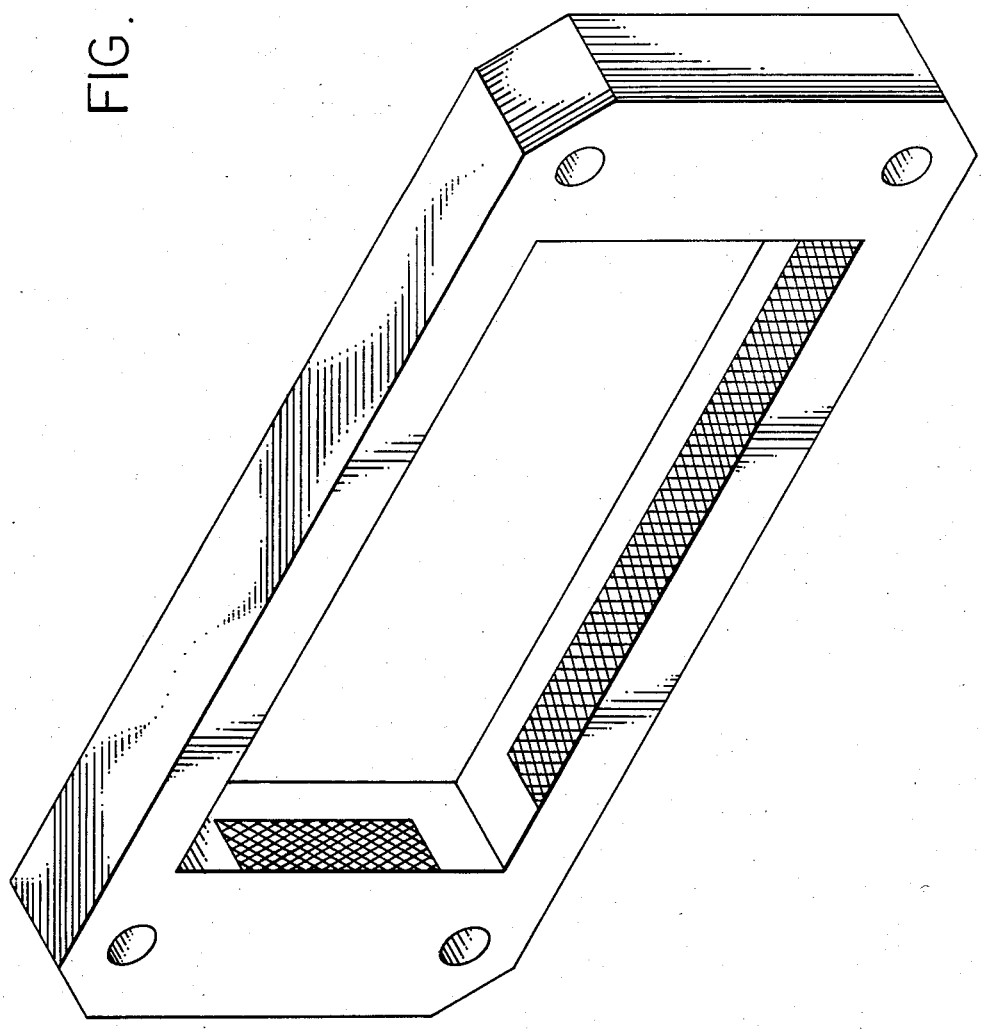
FIG. 9 is a perspective view of an alternative embodiment of the present invention.

An alternative flange is shown in FIG. 9 and consists of bonding material and knurling only, without corner projections. Registration and mandrel usage is as described above. This single piece configuration is used where added strength of corner projections is not required.

What is claimed is:

1. A subassembly for a waveguide joint comprising:
   a metallic rectangular waveguide section having four sides forming four corners;
   a compressible metallic flange for mounting to said waveguide, said flange arranged and configured for compression fitting onto said waveguide and having four interior corners; and
   means for creating an electromagnetic seal at each of said four corners of said waveguide, said means creating said electromagnetic seal when said flange is compressed upon said waveguide;
   wherein said means for creating an electromagnetic seal comprises a plurality of angular projections disposed on interior surfaces of said flange, said projections disposed within said interior corners of said flange and at least on both sides of each of said interior corners in order to completely engage said corners of said waveguide upon compression of said flange,
   whereby said subassembly is substantially electromagnetically leak-proof upon assembly.

2. An assembled waveguide coupling formed on a rectangular waveguide section having four sides forming four corners comprising:
   a compressible flange having interior surfaces disposed toward exterior surfaces of said waveguide section, a portion of said interior surfaces of said compressible flange being knurled and characterized by a plurality of metallic points disposed toward said exterior sides of said waveguide section, said flange further comprising at least two dihedral projections formed in each interior corner of said flange, said dihedral projections arranged and configured to oppose said corners of said waveguide section, said compressible flange being compressed onto said waveguide thereby driving said dihedral projections into said corners to locally deform said corners of said waveguide section, said dihedral projections and locally deformed corners of said waveguide section defining a labyrinthian passage; and
   adhesive disposed between said interior surfaces of said flange and said exterior sides of said waveguide section, said adhesive overlying said knurled portions being forced therefrom at least until said plurality of metallic points establish an electrical contact with said exterior sides of said waveguide section upon compression of said flange unto said waveguide section.

3. The coupling of claim 2 wherein said compressible flange is comprised of an upper and a lower identical half, such flange being compressed onto said waveguide section when said upper and lower halves are hydraulically pressed together onto said waveguide section, and further comprising end means for coupling said upper and lower halves together upon compression onto said waveguide section.

4. An assembled waveguide coupling formed on a rectangular waveguide section having four sides forming four corners comprising:
a compressible flange having interior surfaces disposed toward exterior surfaces of said waveguide section, a portion of said interior surfaces of said compressible flange being knurled and characterized by a plurality of metallic points disposed toward said exterior sides of said waveguide section, said plurality of metallic points establishing an electrical contact with said exterior sides of said waveguide section upon compression of said flange onto said waveguide section, said flange further comprising at least two dihedral projections formed in each interior corner of said flange, said dihedral projections arranged and configured to oppose said corners of said waveguide section, said compressible flange being compressed onto said waveguide thereby driving said dihedral projections into said corners to locally deform said corners of said waveguide section, said dihedral projections and locally deformed corners of said waveguide section defining a labyrinthian passage.

* * * * *